Oct. 27, 1925.
F. W. JACKSON
CROSSHEAD PIN AND LUBRICATOR THEREFOR
Filed May 12, 1925
1,559,435
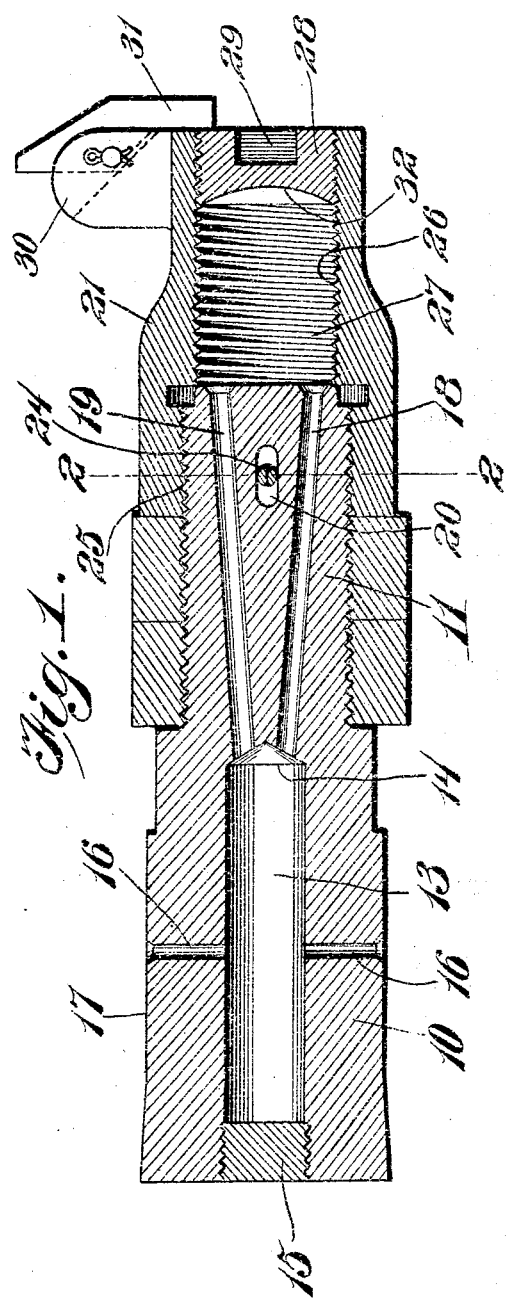
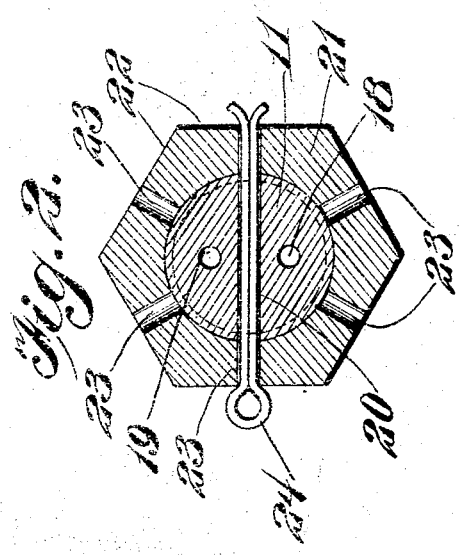
Inventor
Fred W. Jackson
By Watson E. Coleman
Attorney Patented Oct. 27, 1925.

1,559,435

UNITED STATES PATENT OFFICE.

FRED W. JACKSON, OF NEEDLES, CALIFORNIA.

CROSSHEAD PIN AND LUBRICATOR THEREFOR.

Application filed May 12, 1925. Serial No. 29,771.

*To all whom it may concern:*

Be it known that I, FRED W. JACKSON, a citizen of the United States, residing at Needles, in the county of San Bernardino and State of California, have invented certain new and useful Improvements in Crosshead Pins and Lubricators Therefor, of which the following is a specification, reference being had to the accompanying drawings.

This invention relates to improvements in crank or cross head pins and lubricators therefor.

An important object of the invention is to provide a lubricator attached to the threaded shank of such pins and feeding lubricant to the body of the pin through the shank in which the construction is such that the pin is not dangerously weakened by the formation of lubricant ports. At the same time, a relatively large storage chamber for lubricant is provided within the pin.

A still further object of the invention is a construction of this character permitting the use of a retaining key for the lock nuts by means of which the pin is secured in position.

A still further object of the invention is the production of a lubricant container for engagement with the threaded shank which may be substituted for one or both of the nuts ordinarily applied to such shank.

These and other objects I attain by the construction shown in the accompanying drawings, wherein for the purpose of illustration is shown a preferred embodiment of my invention and wherein:—

Figure 1 is a longitudinal sectional view taken through a crank pin and lubricator therefor constructed in accordance with my invention; and Figure 2 is a section on the line 2—2 of Figure 1.

Referring now more particularly to the drawings, the numeral 10 indicates the body of the pin and 11 the threaded shank thereof. It is well known to those familiar with the art that these threaded shanks are considerably reduced from the diameter employed in the body of the pin. In accordance with my invention, I form from the large end 12 of the pin or that end which is remote from the threaded shank 11 an axial bore 13 which is of slightly less length than the body of the pin so that it terminates short of the shank end of the body, as at 14. The outer end of this bore is plugged, as indicated at 15, and the body is formed with radially disposed ports 16 communicating with the bearing face 17 of the pin.

Bores are formed through the threaded shank 11, as indicated at 18, 19, these bores having their outer ends opening through the outer end of the shank at points adjacent the perimeter of the shank and arranged upon one diameter thereof and these bores converge rearwardly so that their inner ends communicate with the inner end of the bore 13. It will be obvious that by this construction, a space is provided between the bores permitting the formation in the threaded extension of a diametrically extending slot 20 at right angles to a plane including the bores and elongated upon the axis of the shank. The purpose of this slot will hereinafter appear.

The grease cup employed consists of a body 21 formed at its inner end with wrench squares 22, notched or slotted, as at 23, for the passage of a cotter key 24, which cotter key will be directed through the slot 20. It will be obvious that the elongation of this slot will permit adjustment of the body 21 which is interiorly threaded, as at 25, for engagement with the threaded shank so that this body may be employed as a nut for the adjustment of the pin. The outer end of the body has the bore thereof reduced and interiorly screw-threaded, as at 26, to produce a grease compartment 27, the outer end of which is closed by a shiftable plug 28, socketed, as at 29, for the reception of a wrench. At its outer end, the body is provided with outwardly projecting wings 30 between which is pivoted a latch 31 for retaining a plug within the bore, this latch being preferably constructed in accordance with my prior Patent, No. 1,488,393, granted March 25, 1924, for plug retainers. The under surface of this plug is preferably crowned, as at 32, to permit the plug to be properly engaged with the threads of the reduced portion of the bore when the bore is completely filled with grease, the concavity accommodating the excess grease and thus preventing crossing of the threads in starting the plug.

It will be obvious that the bore 13, due to the manner of its formation, will not weaken the pin at the junction of the threaded shank with the body thereof which is ordinarily the weakest point of the pin. It will also be obvious that the construction hereinbefore recited permits the use of a diametrically extending cotter key for locking the retaining element of the pin in adjusted position and that this would not be possible were a grease feeding bore provided which opens through the outer end of the shank and which is axial to the shank.

It will furthermore be obvious that a grease cup of this character may be readily manipulated, is firmly locked against loss of its plug and does not require the use of a specially constructed pin but permits the adaptation of the pin already in use. Since the structure is obviously capable of a certain range of change and modification without materially departing from the spirit of my invention, I do not limit myself to such specific structure except as hereinafter claimed.

I claim:—

1. In combination with a pin having a body and a reduced threaded shank, an axial bore formed in the body from the end thereof remote from said shank and of less length than the body, the outer end of said bore being plugged, the body having ports communicating with said bore and with the bearing surface of the pin, said shank having a reduced bore communicating with the bore of the body, a retaining element for the pin mounted upon the pin and extending beyond the end thereof and having a bore communicating with the outer end of the pin, a plug threaded in the outer end of the bore and means for retaining the plug within the bore, the bore of said threaded shank opening through the outer end of the threaded shank adjacent the perimeter thereof and angling inwardly longitudinally of the shank for communication with the inner end of the bore of the body, the threaded shank having a diametrically extending slot elongated upon the axis of the shank and adapted for the passage of a cotter key for the retaining element.

2. In combination with a pin having a body and a reduced threaded shank, an axial bore formed in the body from the end thereof remote from said shank and of less length than the body, the outer end of said bore being plugged, the body having ports communicating with said bore and with the bearing surface of the pin, said shank having a reduced bore communicating with the bore of the body, a retaining element for the pin mounted upon the pin and extending beyond the end thereof and having a bore communicating with the outer end of the pin, a plug threaded in the outer end of the bore and means for retaining the plug within the bore, the bore of said shank being spaced at its outer end from the axis of the shank to thereby permit the formation in the shank of a diametrically extending retaining pin receiving opening.

In testimony whereof I hereunto affix my signature.

FRED W. JACKSON.